United States Patent [19]
Stefanutti

[11] 3,791,500
[45] Feb. 12, 1974

[54] FLUID ACTIVATED DOUBLE-ACTING CLUTCH WITH FLUID METERING MEANS

[75] Inventor: Oscar E. Stefanutti, Bloomfield Hills, Mich.

[73] Assignee: D.A.B. Industries, Inc., Detroit, Mich.

[22] Filed: Apr. 5, 1972

[21] Appl. No.: 241,335

[52] U.S. Cl. ........... 192/87.17, 192/89 B, 192/109 F
[51] Int. Cl. .............................................. F16d 25/10
[58] Field of Search .. 192/87.17, 89 B, 48.91, 18 A, 192/85 AA, 87.15, 87.16, 109 F

[56] References Cited
UNITED STATES PATENTS

| | | | |
|---|---|---|---|
| 2,898,774 | 8/1959 | Lammerz | 192/87.17 X |
| 3,040,408 | 6/1962 | Schou | 192/87.15 X |
| 3,190,421 | 6/1965 | Schulz | 192/85 AA |
| 2,920,732 | 1/1960 | Richards et al. | 192/87.17 |
| 3,613,848 | 10/1971 | Reiff | 192/70.28 |
| 3,360,087 | 12/1967 | Hilpert | 192/87.17 |
| 3,245,507 | 4/1966 | Hilpert | 192/87.17 |
| 3,054,491 | 9/1962 | Bloch et al. | 192/87.17 |
| 3,243,026 | 3/1966 | Snoy et al. | 192/87.17 |
| 3,324,981 | 6/1967 | Aschauer | 192/87.17 X |

Primary Examiner—Benjamin W. Wyche
Attorney, Agent, or Firm—Whittemore, Hulbert & Belknap

[57] ABSTRACT

The clutch is a double-acting device which includes a shaft having a pair of spaced apart first clutch plate assemblies carried thereon. A second pair of clutch plate assemblies are carried by a pair of drive members which are rotatably mounted on the shaft. The second pair of clutch plate assemblies are placed in operative relationship to the first pair of clutch plate assemblies. Hydraulic power means are provided between the pairs of clutch plate assemblies to compress one or the other to cause frictional engagement of the plates to thereby provide a driving connection therebetween. Spring means are provided to urge either the clutch plates or the hydraulic power means to a neutral position upon relief of hydraulic pressure.

3 Claims, 6 Drawing Figures

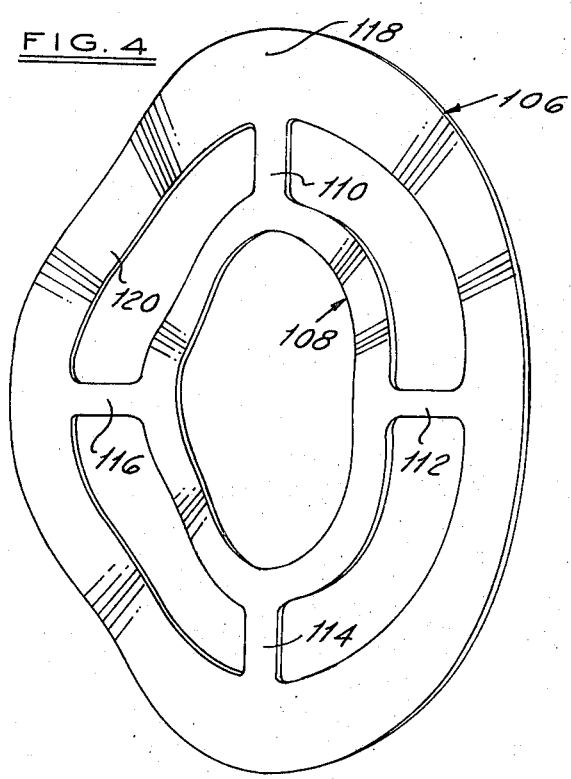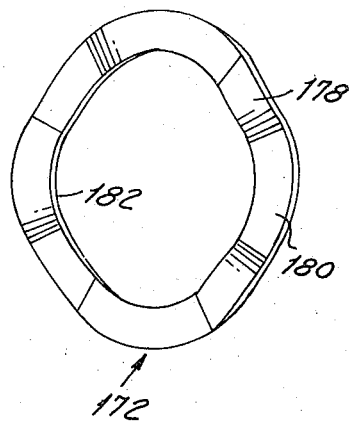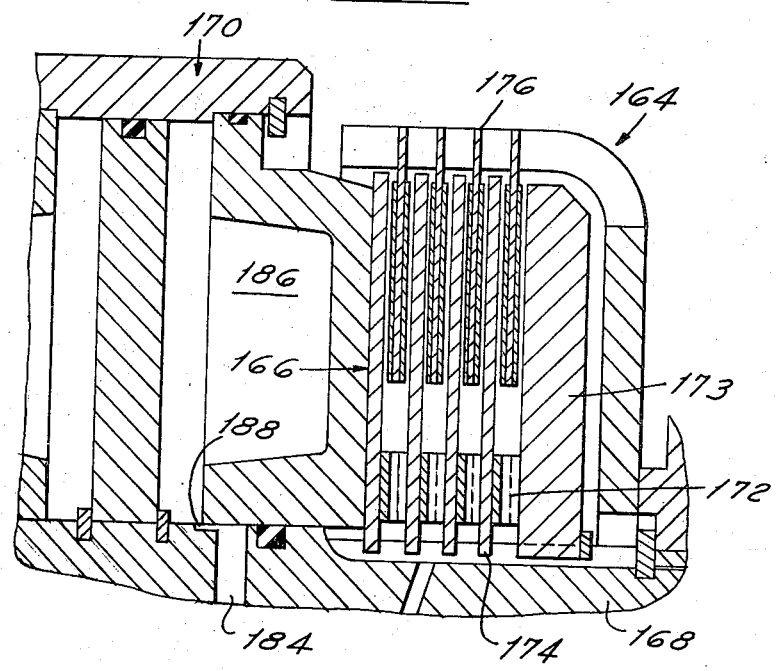

FLUID ACTIVATED DOUBLE-ACTING CLUTCH WITH FLUID METERING MEANS

BACKGROUND OF THE INVENTION

The present clutch assembly, which is of the double-acting type, possesses advantages over the prior known constructions in that it is a simplified device having few parts but which works effectively and which is very durable. The simplification of the construction not only results in a lower initial manufacturing cost but also results in less maintenance cost because there are fewer parts to wear out.

SUMMARY OF THE INVENTION

The double-acting clutch assembly comprises a shaft having a pair of spaced apart first clutch plate assemblies carried thereon. Each clutch plate assembly comprises a plurality of spaced apart first clutch plates. Each first clutch plate is non-rotatably but axially slidably mounted on the shaft. A pair of drive members are rotatably mounted on the shaft. Each drive member includes a cup-shaped element which extends over one of the first clutch plate assemblies. A pair of second clutch plate assemblies are provided. Each second clutch plate assembly is carried by one of the cup-shaped elements. Each second clutch plate assembly comprises a plurality of spaced apart second clutch plates extending between the spaces between the first clutch plates in gripping relationship thereto. Each second clutch plate is non-rotatably but axially slidably mounted in its respective cup-shaped element. An actuator structure is mounted on the shaft between the pairs of clutch plate assemblies for axial reciprocable movement therebetween. Means are provided to shift the actuator structure in either axial direction into engagement with one of the pairs of first and second clutch plate assemblies to cause driving engagement of the clutch plates.

IN THE DRAWINGS

FIG. 4 is a view in perspective of a spring utilized in the clutch of FIG. 1;

FIG. 5 is a segmental view in section of a clutch plate and piston assembly illustrating a modified embodiment of the clutch; and FIG. 6 is a view in perspective of a spring utilized to separate the clutch plates of the FIG. 5 embodiment.

Figure 1:
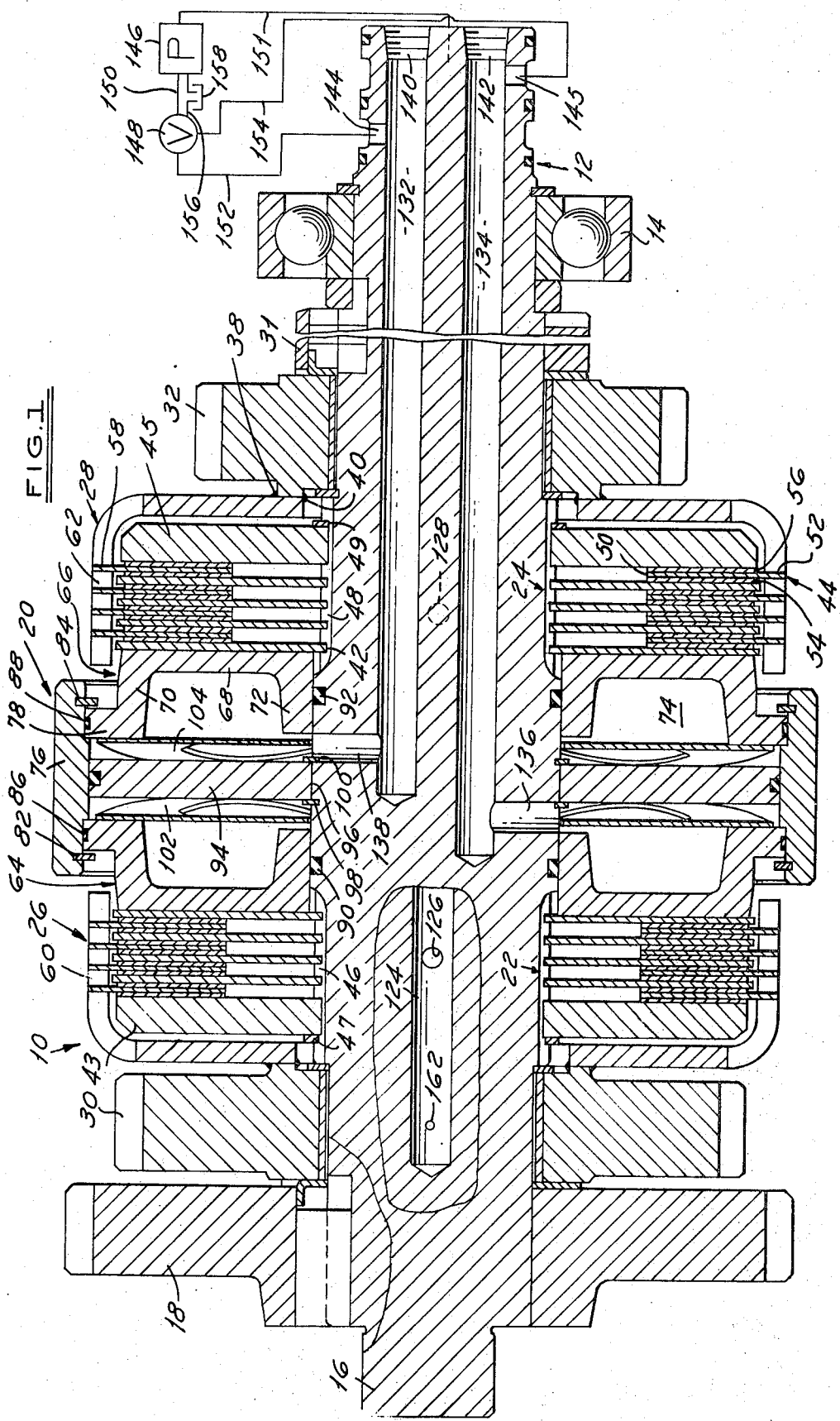
FIG. 1 is a view in longitudinal section of a clutch in accordance with one embodiment of the present invention.
Figure 2:
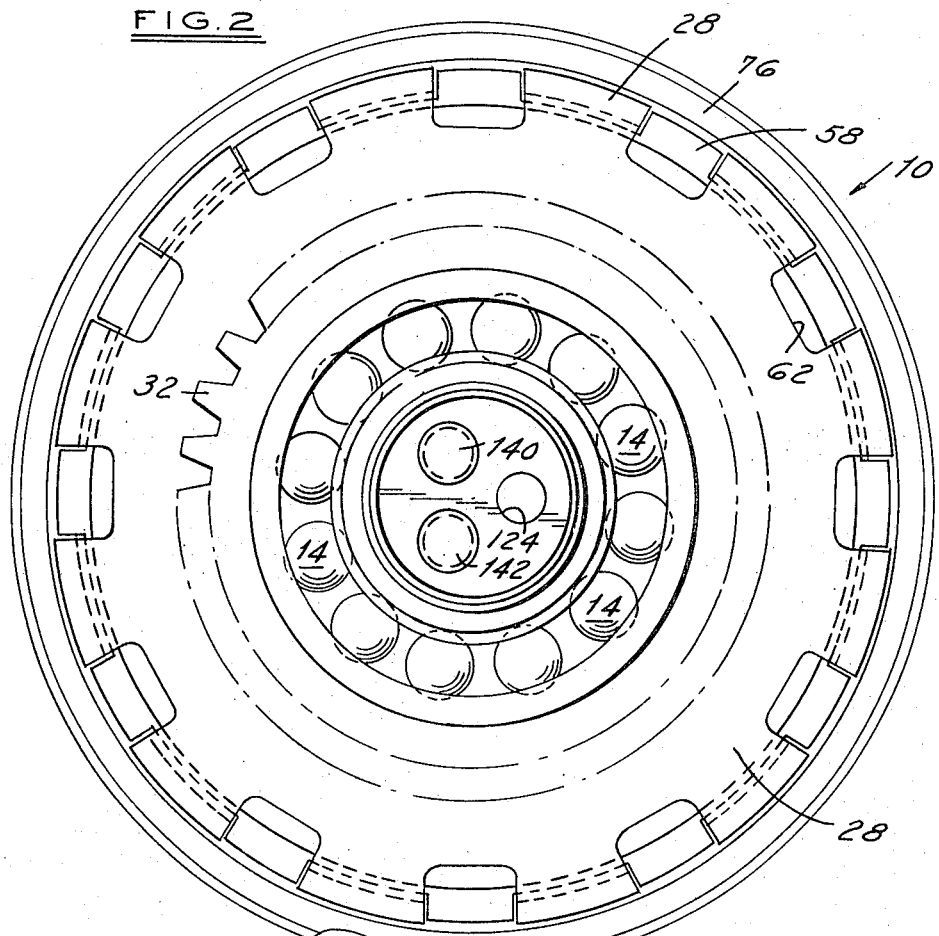
FIG. 2 is a right end view of the clutch of FIG. 1.

Referring to the embodiment illustrated in FIGS. 1–4, it will be noted that the clutch 10 includes a shaft 12 which is journaled in suitable support structure (not shown) at one end by means of a ball bearing 14 and at the other end by means of shaft portion 16 which is received in a suitable bearing (not shown). The shaft 12 is driven from a suitable power source by means of a gear 18 fixedly mounted on the shaft adjacent the shaft portion 16.

A piston structure 20 is provided on the shaft 12 centrally thereof. The piston structure 20 is adapted for axial movement either to the right or left as viewed in FIG. 1 to compress one or the other of clutch plate assemblies 22, 24. Compression of one of the clutch plate assemblies causes the clutch plates to grip one another with the assembly then moving as a unit to rotate one or the other of cup-shaped elements 26, 28. Each of the elements 26, 28 is secured to an adjacent gear 30, 32, each of which is rotatably mounted on the shaft 12. The hubs of the gears are secured to elements 26, 28 by welding at 38, 40. Preferably, the welding procedure used is inertial welding in order to efficiently form the strong weld which is necessary for the driving forces encountered in use of the clutch. An additional output gear may be provided at 31 between the gear 32 and bearing 14 if desired. Such an additional gear could be utilized, for example, to drive a second clutch.

Each of the stacks of clutch plates 22, 24 is composed of alternate reaction plates 42 and friction plates 44. The reaction plates 42 are bare metal plates. These plates are referred to as reaction plates even though, as in the present case, they may be the driving plates. Each plate 42 has a central opening therethrough the periphery of which is serrated. The shaft 12 has mating peripheral serrated portions 46, 48 over which the plates 42 are received for driving engagement with the shaft 12 with freedom to move axially. Back-up plates 43, 45 and retaining rings 47, 49 are provided to limit the axial movement of the plates.

The friction plates 44 are ring-like members having relatively large central openings 50. Each friction plate 44 comprises a central metallic ring element 52 having adhered on each face thereof a ring of friction material 54, 56. The friction material is conventionally fabricated of a paper-like substance. However, other friction rings such as plastic friction rings may be used as well as friction rings having metallic material therein. The frictional nature of the material results in the friction rings frictionally engaging the reaction rings upon compression of the stack of rings with the result that the rings will turn together as a unit with vry little slippage under relatively high driving forces. The metallic rings 52 have spaced apart peripheral lugs 58 which are received in mating longitudinal slots 60, 62 provided in the sidewalls of the cup-like driving elements 26, 28. Thus the driving elements 26, 28 and associated gears 30, 32 are rotated upon rotation of the friction plates.

As previously mentioned, the stacks of clutch plates are compressed by means of the central piston structure 20. The piston structure 20 comprises a pair of pistons 64, 66 which are slidably received on the shaft 12. The pistons have an annular shape, each including a back wall from which extend longitudinal outer and inner peripheral walls, these walls defining channel shaped annular fluid chambers 74, 75. The pistons are oriented on the shaft 12 so that the mouths of the chambers are diametrically opposed. The pistons are received within a hollow cylindrical member 76. Each piston has a peripheral flange 78 which extends into an inset portion on the inner periphery of member 76. Retaining elements 82, 84 are provided interiorly of member 76 outside of the flanges to thereby secure the pistons within the member 76. Suitable annular sealing elements 86, 88, 90, 92 are provided to establish a fluid-tight relationship between pistons 64, 66, shaft 12 and member 76.

A circular dividing wall 94 is provided on the shaft 12 between the pistons 64, 66. The wall 94 has a central opening 96 for reception on the shaft. A retaining element 98, 100 is provided on either side of the wall 94 to maintain the wall in a fixed position. A pair of annular undulated spring plates 102, 104 are received on the shaft, each of the springs being located between one of the pistons 64, 66 and the wall 94. As will be noted in FIG. 4, each spring comprises an outer ring 106 and an inner ring 108 connected to each other by means of webs 110, 112, 114, 116. The rings are formed in an undulating configuration so that, as viewed in FIG. 4, some portions 118 extend in one direction while adjacent portions 120 extend in the opposite direction. As a consequence, when the springs are compressed by axial movement of the pistons 64, 66, they will exert a bias tended to return the pistons to the central position illustrated in FIGS. 1 and 3.

Figure 3:
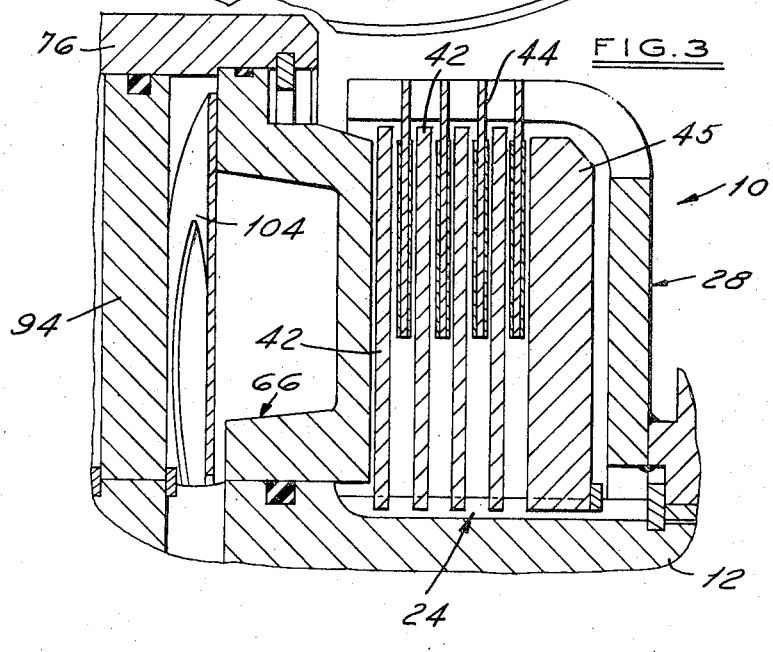
FIG. 3 is an enlarged segmental view of the upper right portion of the clutch of FIG. 1.

In this position, as best illustrated in FIG. 3, the stacks of clutch plates do not have any pressure exerted on them by either of the pistons and thus are able to assume a position wherein the adjacent plates are separated one from the other by a small space. The clutch plates will tend to assume the separated position as a result of bumping off one another and also as a result of a layer of oil which is present between the plates as a result of passing cooling oil into cup-shaped members 26, 28 via (FIG. 1) a central axial passageway 124 in the shaft 12 and radial passageways 126, 128 leading therefrom. This oil is injected into the stacks of plates for cooling purposes but also has the effect of tending to separate the plates when pressure is not being applied by the pistons. As will be noted in FIG. 3, there is also a slight clearance between the piston 66 and adjacent plate 42 when pressure is not being applied by the piston. The use of two springs 102, 104 of equal strength with each spring bearing against the fixed wall 94 insures that the piston assembly will be returned to the central or neutral position when fluid pressure is not applied to the interior thereof.

Fluid pressure is applied to one or the other of the pistons 64, 66 by means of axial passageways 132, 134 (FIG. 1) through the shaft 12 and radial passageways 136, 138 leading therefrom into communication with the piston cavities. The ends of passageways 132, 134 are sealed by means of plugs 140, 142. Fluid under pressure is supplied via radial passageways 144, 145.

Hydraulic fluid under pressure is provided by means of an external pump 146 and valve 148 which are diagrammatically illustrated. The pump 146 draws hydraulic fluid from a sump 158 and pumps it under pressure to the valve 148 via line 150. The valve 148 is a multi-action valve. A pair of lines 152, 154 extend from the valve to, respectively, radial passageways 144, 145. Depending upon the setting of valve 148, fluid under pressure will be pumped through one or the other of the lines 152, 154. Fluid pumped through the line 152 flows through the passageways 144, 132, 138 into the piston chamber 74. This causes a force build-up in chamber 74 which, reacting against the fixed wall 94, causes motion of the piston structure 20 to the right as viewed in FIG. 1. This results in compressing the stack of clutch plates 24 with the consequence of power rotation of the gear 32. The rightward movement of the piston structure causes the spring 102 to be flattened while pressure against the other spring 104 is relieved.

Where it is desired to de-clutch, the valve 148 is adjusted to close the line 150 to the pump thus relieving the fluid pressure applied to the piston structure. At the same time a vent line 156 from the valve 148 is opened thus allowing hydraulic fluid to be vented to the sump 158. The spring 102 which had been compressed will then bias the piston structure to the left as viewed in FIG. 1 to again center the piston structure and place the clutch 10 in the neutral position. The other stack of clutch plates 22 may be engaged by pumping fluid through line 154.

Fluid pressure may be maintained in the chambers 74, 75 at all times which may result in quicker clutch response and particular modulating characteristics. The amount of fluid flow which occurs during clutching and de-clutching is actually quite small. Piston movement for clutching results from applying a higher pressure in one of the chambers 74, 75 than exists in the other. It is the pressure differential which causes movement. In the de-clutched condition, equal pressure, as for example forty psi, may be applied to each chamber 74, 75.

As previously mentioned, hydraulic fluid is also pumped into the stacks of clutch plates 22, 24 via line 151 from the pump 146 which leads to the axial passageway 124 and thence by radial passageways 126, 128 into the space occupied by the clutch plates. As will be appreciated, the clutch is enclosed in a clutch housing which will normally include the sump 158. The hydraulic fluid leaks from the stacks of clutch plates into the sump 158 to be recycled by the pump 146. Radial passageways may also be provided extending from the passageway 124, such as radial passageway 162, to lubricate the bearings for the gears 30, 32.

A modified version of the clutch is illustrated in FIGS. 5 and 6. The clutch 164 is in most respects the same as the previously described clutch 10. The clutch 164 includes a pair of stacks of clutch plates 166 arranged as previously described on a shaft 168. A piston structure 170 of the type previously described is also provided. However, the springs 102, 104 have been replaced by undulating spring plates 172 provided individually between each adjacent reaction clutch plate 174 and between the outermost plate and back-up plate 173.

As will be noted in FIG. 6, the spring plates 172 are much smaller in diameter than the previous springs utilized. The spring plates 172 comprise an annular band of spring metal which is formed in an undulating pattern to result in portions 178 extending in one direction with adjacent portions 180 extending in the opposite direction with the result that flattening of spring plates 172 results in this spring asserting a biasing force tending to return the spring to the shape illustrated. The spring has a central opening 182 of a size to fit over the shaft 168. the outer diameter of the spring is considerably less than the inner diameter of the friction clutch plates 176 so that the springs do not contact these plates. The springs 172 each have substantially the same spring force. After the springs are flattened or compressed by means of the piston structure 170, the springs will tend to return to the original configuration thereof. The inter-action between the springs will result in a point of equilibrium being reached wherein the reaction plates will be spaced apart from each other equal distances to thereby be centered between the friction plates without contacting the friction plates thus placing the clutch plate in a neutral position. As a consequence of the positive positioning of the reaction plates in the FIG. 5 embodiment, there is somewhat less drag between the plates than is the case in the FIG. 1 embodiment.

The FIG. 5 construction is also modified with respect to FIG. 1 in that the radial passageway 184 leading into the piston cavity 186 does not directly communicate with the piston cavity. The passageway is offset to terminate in alignment with the piston. A short longitudinally extending shallow slot 188 extends from the passageway 184 into the cavity 186. Consequently, the flow of hydraulic fluid is metered with the result that it will flow into the cavity 186 at a slower rate than was the case in FIG. 1. This results in the action of the clutch being slower. However, by feeding the fluid under pressure into the cavity at a slower rate, less shock results. The clutch is engaged at a gradual rate and assumes the load gradually to thus reduce wear and tear on the various components involved, including the gearing and clutch plates.

What I claim as my invention is:

1. A double-acting clutch comprising a shaft, a pair of spaced apart first clutch plate assemblies carried on said shaft, each first clutch plate assembly comprising a plurality of spaced apart first clutch plates, each first clutch plate being non-rotatably but axially slidably mounted directly on the shaft without any intermediate structure, a pair of drive members rotatably mounted on the shaft, each drive member including a cup-shaped element extending over one of the first clutch plate assemblies, a pair of second clutch plate assemblies each carried by one of the cup-shaped elements, each of the second clutch plate assemblies comprising a plurality of spaced apart second clutch plates extending between the spaces between the first clutch plates in gripping relationship thereto, each second clutch plate being non-rotatably but axially slidably mounted in its respective cup-shaped element, an actuator structure comprising a fluid actuated double acting piston structure mounted on said shaft between said pairs of clutch plate assemblies for axial reciprocable movement therebetween, and means to shift said actuator structure in either axial direction into engagement with one of said pairs of clutch plate assemblies to cause driving engagement of the clutch plates, said double-acting piston structure comprising partition means mounted on said shaft and fixed against axial movement, a pair of pistons slidably mounted on said shaft, one of said pistons being positioned on one side of said partition means with the other piston being positioned on the other side of said partition means, each of said pistons including a cavity which defines with said partition means a sealed pressure chamber, and fluid passageway means extending axially of the shaft into communication with said chamber for individually supplying differential fluid pressure to one or the other of the chambers for shifting a respective piston axially into pressure engagement with the adjacent clutch plate assemblies to cause driving engagement thereof, said fluid passageway means comprising a pair of main passageways of relatively large diameter, each main passageway extending axially and thence radially towards the outer periphery of the shaft, said passageways communicating with a relatively shallow axially extending trough provided in the surface of the shaft with a portion thereof in communication with its respective piston pressure chamber whereby fluid under pressure is injected into the pressure chamber at a metered rate.

2. A clutch as defined in claim 1, further characterized in the provision of an annular undulated spring plate disposed between each of said pistons and said partition means, said spring plates biasing the pistons away from the partition means, each spring plate having substantially the same spring force whereby to position said pistons at substantially the same distance from the partition means when the fluid pressure is equal in said pressure chambers, said pistons being located with respect to said clutch plates to be out of engagement therewith upon being positioned by said undulated spring plates.

3. A double-acting clutch comprising a shaft, a pair of spaced apart first clutch plate assemblies carried on said shaft, each first clutch plate assembly comprising a plurality of spaced apart first clutch plates, said first clutch plates being non-rotatably but axially slidably mounted directly on the shaft without any intermediate structure, a pair of drive members rotatably mounted on the shaft, each drive member including a cup-shaped element extending over one of the first clutch plate assemblies, a pair of second clutch plate assemblies each carried by one of the cup-shaped elements, each of the second clutch plate assemblies comprising a plurality of spaced apart second clutch plates extending between the spaces between the first clutch plates in gripping relationship thereto, each second clutch plate being non-rotatably but axially slidably mounted in its respective cup-shaped element, an actuator structure comprising a fluid actuated double-acting piston structure mounted on said shaft between said pairs of clutch plate assemblies for axial reciprocable movement therebetween, said double-acting piston structure comprising partition means mounted on said shaft and fixed against axial movement, a pair of pistons slidably mounted on said shaft, one of said pistons being positioned on one side of said partition means with the other piston being positioned on the other side of said partition means, each of said pistons including a cavity which defines with said partition means a sealed pressure chamber, fluid passageway means extending axially on the shaft into communication with each of said chambers for individually supplying differential fluid pressure to one or the other of the chambers for shifting a respective piston axially into pressure engagement with the adjacent clutch plate assemblies to cause driving engagement thereof, a hollow cylindrical member extending around said pistons and said partition means in fluid sealing engagement therewith, said hollow cylindrical member being slidable with respect to said partition means and connected to said pistons whereby said pistons are caused to move as a unit, each of said pistons having a channel-shaped cross-section defining said pressure chamber, the inner peripheral wall portion of each piston being in slidable and rotatable contact with the shaft, and a seal structure provided between said inner peripheral wall portion and the shaft for fluid-tight contact therebetween, said fluid passageway means comprising a pair of main passageways of relatively large diameter, each main passageway extending axially and thence radially towards the outer periphery of the shaft, said passageways communicating with a relatively shallow axially extending trough provided in the surface of the shaft with a portion thereof in communication with its respective piston pressure chamber whereby fluid under pressure is injected into the pressure chamber at a metered rate.

* * * * *